United States Patent [19]

Shiba et al.

[11] Patent Number: 4,905,113

[45] Date of Patent: Feb. 27, 1990

[54] MAGNETIC TAPE CASSETTE HAVING A SLIDER MOUNTED ON THE LOWER CASING MEMBER

[75] Inventors: Haruo Shiba; Takateru Satoh; Masaru Ikebe; Morimasa Sasaki, all of Nagano, Japan

[73] Assignee: TDK Corporation, Tokyo, Japan

[21] Appl. No.: 160,326

[22] Filed: Feb. 25, 1988

[30] Foreign Application Priority Data

Feb. 25, 1987 [JP] Japan .............................. 62-25565[U]
Feb. 25, 1987 [JP] Japan .............................. 62-25566[U]

[51] Int. Cl.⁴ .......................................... G11B 23/087
[52] U.S. Cl. .................................................. 360/132
[58] Field of Search ........................ 360/132; 242/198

[56] References Cited

U.S. PATENT DOCUMENTS 4,742,416  5/1988  Oishi et al. ........................ 360/132

Primary Examiner—Robert S. Tupper
Attorney, Agent, or Firm—Oblon, Spivak, McClelland, Maier & Neustadt

[57] ABSTRACT

A magnetic tape cassette capable of effectively preventing separation of a slider from a casing even when it is dropped or any external force is applied thereto, resulting in ensuring its safety and reliability. The magnetic case includes a casing constituted by an upper casing member and a lower casing member and a slider slidably mounted on the lower casing member. Each of side walls of the slider includes a lower portion opposite to an outer surface of a side wall of the lower casing member and an upper portion opposite to an inner surface of the side wall of the upper casing member. The cassette also includes a mechanism for preventing the slider from being disclocated from the casing. The mechanism may be provided by positioning the inner surface of the side wall of the upper casing member inwardly from the outer surface of the side wall of the lower casing member. Alternatively, it may be provided by positioning the inner surface outwardly from the outer surface through a slit defined therebetween and forming the upper portion of the side wall of the slider into a thickness larger than the slit.

4 Claims, 4 Drawing Sheets

FIG.7A   FIG.7B   FIG.8
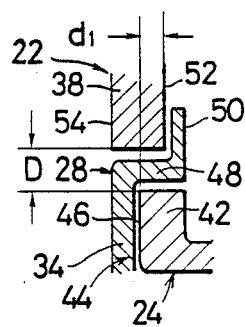
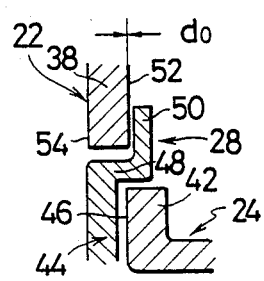
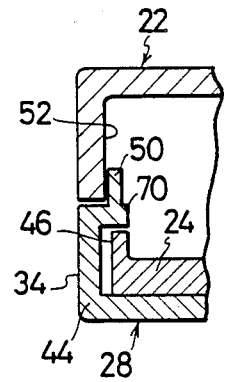
FIG.9A   FIG.9B
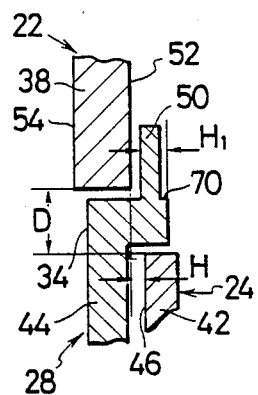
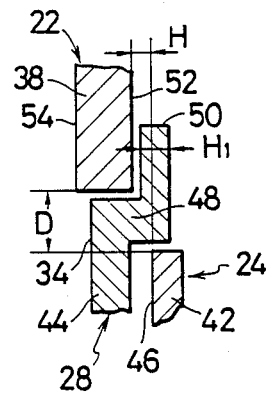

MAGNETIC TAPE CASSETTE HAVING A SLIDER MOUNTED ON THE LOWER CASING MEMBER

BACKGROUND OF THE INVENTION

1. Field of the Invention

This invention relates to a magnetic tape cassette, and more particularly to a magnetic tape cassette which is suitable for use for recording and reproducing a digital signal such as, for example, a PCM signal.

2. Description of the Prior Art

A PCM recording and reproducing apparatus is generally used to convert an analog signal such as an acoustic signal to a digital signal such as a PCM signal to carry out recording reproducing of it with respect to a magnetic tape. One of such PCM recording and reproducing apparatus is adapted to use a rotating head to carry out the recording and reproducing at a high density. A magnetic tape for the PCM recording and reproducing apparatus is typically used in a manner to be successively drawn out from a magnetic tape cassette and subjected to recording and reproducing while being wound on a rotating drum.

A magnetic tape used for the PCM apparatus causes dropout of a reproducing signal when a fingerprint, dust or the like adheres thereto. In order to avoid such a problem, it is required to sealedly enclose a magnetic tape in a magnetic tape cassette when it is not used and define a space in the cassette sufficient to receive a guide of the apparatus in the cassette so as to draw out the tape from the cassette during recording or reproducing operation.

In view of the foregoing, a magnetic tape cassette is proposed which includes includes a slider slidably arranged on an outside of a lower casing member constituting a casing of the cassette together with an upper casing member so that it may be slid in a longitudinal direction of the cassette to selectively close a space defined in the cassette for receiving a guide of a recording and/or reproducing apparatus therein. Also, the cassette includes a front cover or lid which is pivotally moved depending on sliding of the slider to selectively cover a front opening or portion of the cassette. The so-constructed magnetic tape cassette, when it is charged in a recording and/or reproducing apparatus, is so operated that the slider which covers a part of each of a bottom surface and side surfaces of the cassette is slid in a rear direction of the cassette to open the space in the cassette for receeiing a guide of the apparatus therein and the front cover is pivotally moved to expose a magnetic tape at the front portion of the cassette. When the cassette is not used, the slider and front cover are so positioned that the magnetic tape may be sealedly received in the cassette.

However, the conventional magnetic tape cassette is deteriorated in its safety during the non-use and its reliability in the operation. More particularly, the conventional cassette, as shown in FIGS. 1A to 1C, includes a casing 20 comprising an upper casing member 22 and a lower casing member 24, and a slider 28 slidably mounted on the lower casing member 24 of the casing 20, wherein an upper half of a rear portion of each side of the cassette is constituted by a part of the upper casing member 22 and its lower half is constituted by a part of each of the slider 28 and the lower casing member 24. Also, in the conventional cassette, in order to prevent the slider 28 from being separated or dislocated from the upper and lower casing members 22, 24 in mounting of the slider 28 on the casing 20, an upper portion 50 of each of sides of the slider is inserted in the casing 20 through a gap defined between the upper casing member 22 and the lower casing member 24 so as to be opposite at an outer surface thereof to an inner surface 52 of each of sides of the upper casing member 22. For this purpose, the upper casing member 22 is so formed that the inner surface 52 of the side of the upper casing member 22 is positioned outwardly from an outer surface 46 of an upper portion of each side of the lower casing member 24 inserted or arranged in the casing 20. Unfortunately, such construction, when the cassette is dropped, for example, by mistake, causes the slider 28 to be deformed due to shock applied thereto as shown in FIG. 1c to lead to dislocation or separation of the slider 28 from the casing 20, resulting in deteriorating safety and reliability of the cassette.

OBJECT OF THE INVENTION

Accordingly, it would be highly desirable to develop a magnetic tape cassette which is capable of effectively preventing separation or dislocation of a slider from a casing when it is dropped or any external force is applied thereto, resulting in ensuring its safety and reliability.

SUMMARY OF THE INVENTION

Generally speaking, in accordance with the present invention, a magnetic tape cassette is provided. The magnetic tape cassette includes an upper casing member and a lower casing member which are combined together to constitute a casing adapted to receive a magnetic tape therein. The upper and lower casing members include side walls between which a gap is defined at least partially. Also, the cassette includes a slider slidably mounted on the lower casing member so as to cover a part of a bottom and sides of the lower casing member. The slider includes side walls each comprising a lower portion opposite to an outer surface of the side wall of the lower casing member, an intermediate portion arranged in the gap, and an upper portion arranged opposite to an inner surface of the side wall of the upper casing member. The cassette further includes slider separation preventing means for preventing the slider from being separated from the casing even when it is dropped or any external force is applied thereto.

In a preferred embodiment of the present invention, the slider separation preventing means may be provided by positioning the inner surface of the side wall of the upper casing member inwardly from the outer surface of the side wall of the lower casing member. Alternatively, it may be provided by positioning the inner surface of the side wall of the upper casing member outwardly from the outer surface of the side wall of the lower casing member with a slit being defined therebetween and forming the upper portion of the side wall of the slider into a thickness larger than the slit.

FURTHER OBJECTS OF THE INVENTION

Accordingly, it is an object of the present invention to provide a magnetic tape cassette which is capable of being firmly assembled to ensure its safety.

It is another object of the present invention to provide a magnetic tape cassette which is capable of exhibiting satisfactory safety and reliability.

It is a further object of the present invention to provide a magnetic tape cassette which is capable of effectively preventing separation of a slider from a casing to safely receive a magnetic tape in the casing even when it is dropped or any external force is applied thereto.

It is still another object of the present invention to provide a magnetic tape cassette which is capable of being readily assembled.

Still other object and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein:

FIGS. 7A and 7B each are an enlarged sectional view showing an essential part of the magnetic tape cassette shown in FIG. 2;

FIG. 8 is a sectional view similar to FIG. 6 showing another embodiment of a magnetic tape cassette according to the present invention; and FIGS. 9A and 9B each are an enlarged sectional view showing an essential part of the embodiment shown in FIG. 8.

DETAILED DESCRIPTION OF THE PREFERRED EMBODIMENTS

Now, a magnetic tape cassette according to the present invention will be described hereinafter with reference to FIGS. 2 to 9.

THE FIRST EMBODIMENT

Figure 1A:
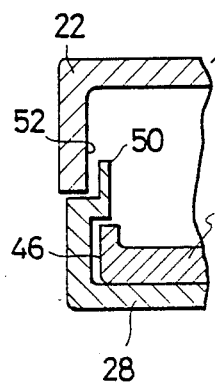
FIGS. 1A, 1B and 1C each are a fragmentary sectional view showing an essential part of a conventional magnetic tape cassette.
Figure 1B:
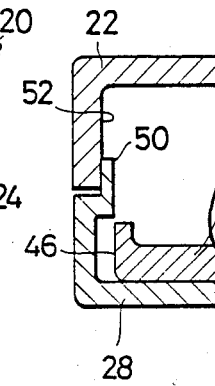
Figure 1C:
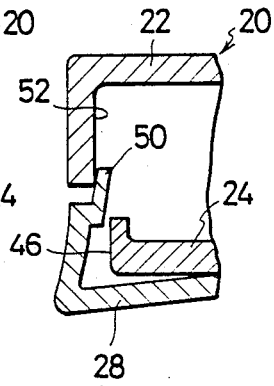
Figure 5:
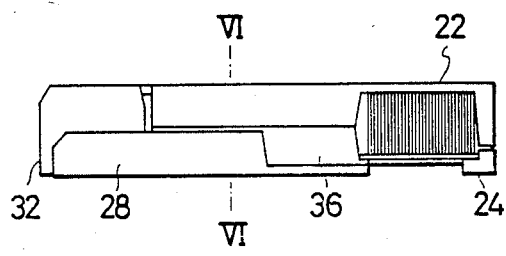
FIG. 5 is a side elevation view of the magnetic tape cassette shown in FIG. 2.
Figure 6:
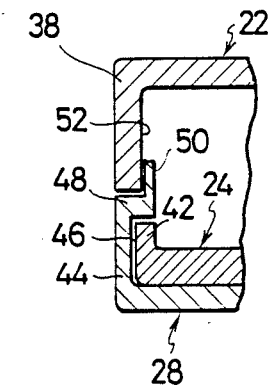
FIG. 6 is a fragmentary sectional view taken along line VI—VI of FIG. 5.
Figure 2:
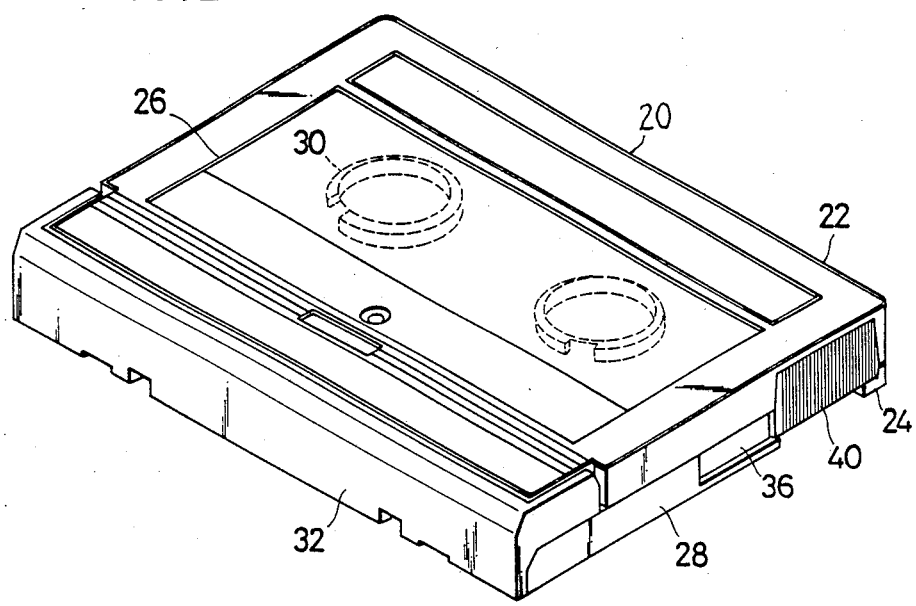
FIG. 2 is a perspective view showing an embodiment of a magnetic tape cassette according to the present invention.
Figure 4:
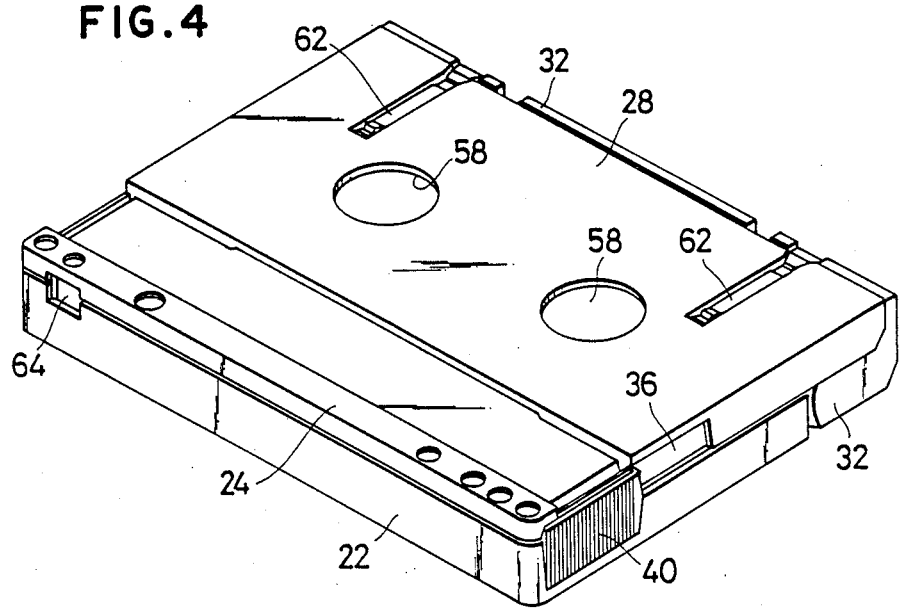
FIG. 4 is a perspective bottom view of the magnetic tape cassette shown in FIG. 2.
Figure 3:
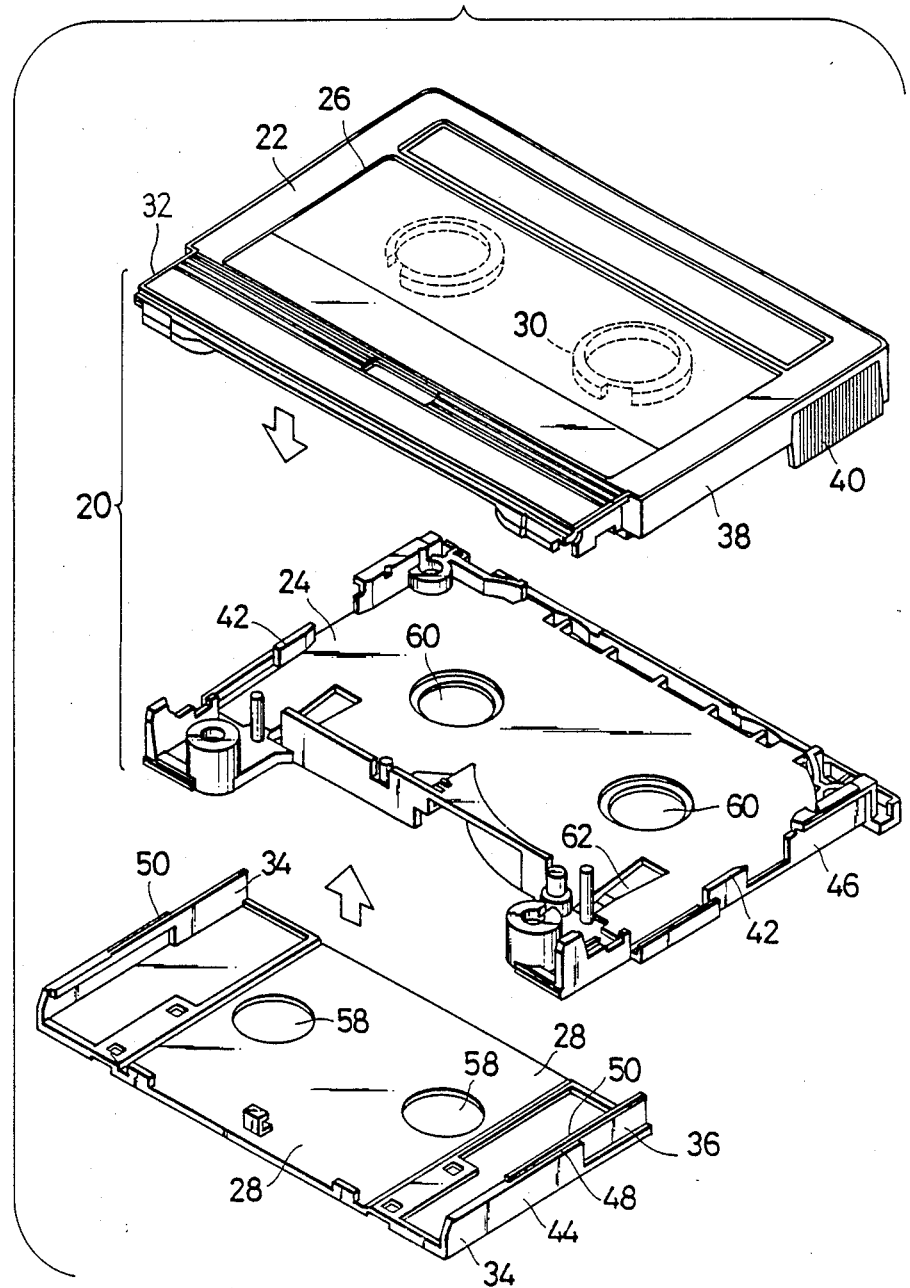
FIG. 3 is an exploded perspective view of the magnetic tape cassette shown in FIG. 2.

FIGS. 2 to 7 show a first embodiment embodiment of a magnetic tape cassette according to the present invention. A magnetic tape cassette of the illustrated embodiment includes a casing 20 formed by joining an upper casing member 22 and a lower casing member 24 by means of screws, as shown in FIG. 3. The upper casing member 22 is provided with a transparent window 26 through which a magnetic tape is observed. also, the magnetic taper cassette includes a slider 28 slidably fitted or mounted on the lower casing member 24 so as to cover a part of each of a bottom and sides of the a casing, as shown in FIGS. 2 to 4.

In the casing 20 is received a pair of reel hubs (not shown) which are rotatably supported on ribs 30 and on which a magnetic tape is wound. On a front portion of the upper casing member 22 is pivotally mounted a front cover or lid 32 to selectively close a front opening of the casing 20.

A rear portion of each of side walls 34 of the slider 28 which is arranged so as to cover a part of each of the bottom and sides of the casing 20 and be slidable with respect to the casing 20, as shown in FIGS. 2 to 4, is formed on an outer surface thereof with a recess 36 which serves to permit the slider 28 to be slid with respect to the casing 20 and guide sliding movement of the slider 28. Correspondingly, a rear portion of each of side walls 38 of the upper casing member 22 is downwardly extended to form a holding wall 40 which is engaged with the recess 36 to slidably contact an inner surface thereof with a wall of the recess 36.

The upper and lower casing members 22 and 24 are abutted at rear walls thereof against each other when they are combined together to form the casing 20. Also, the upper and lower casing members 22 and 24 are so constructed that a gap D is defined between each of the side walls 38 of the upper casing member 22 and each of side walls 42 of the lower casing member 24 opposite to each other when they are combined together, as shown in FIG. 7.

Further, in the illustrated embodiment, the slider 28, as shown in FIG. 7A, is constructed in such a manner that the side wall 34 includes a lower portion 44 opposite to an outer surface 46 of each of the side walls 42 of the lower casing member 24, an intermediate portion 48 substantially horizontally inwardly extending from an upper end of the lower portion 44 and inserted in the gap D, and an upper portion 50 upwardly extending from the intermediate portion 48 so as to be opposite to an inner surface 52 of the side wall 38 of the upper casing member 22.

In addition, the magnetic tape cassette of the illustrated embodiment includes a slider separation preventing mechanism or means for preventing the slider 28 from being dislocated or separated from the casing 20 even when it is dropped or any external force is applied thereto. More particularly, the magnetic tape cassette is so constructed that the inner surface 52 of each of the side walls 38 of the upper casing member 22 is positioned inwardly by a significant distance $d_1$ from the outer surface 46 of each of the side walls 42 of the lower casing member 24. This may be accomplished by substantially inwardly spacing the inner surface 46 of the lower casing member 24 by the distance $d_1$ as shown in FIG. 7A. Alternatively, this may be attained by positioning the inner surface 52 slightly inwardly from the outer surface 46 by a slight distance $d_0$ as shown in FIG. 7B. In this instance, each of the side walls 38 of the upper casing member 22 is preferably formed to have an outer surface 54 vertically substantially flush with an outer surface of the lower portion 44 of the slider 28, because such construction facilitates handling of the cassette. Also, it is preferable that the side wall 38 of the upper casing member 22 is formed to have a thickness larger than that of the side wall 42 of the lower casing member 24 so that the side walls 38 and 42 of the upper and lower casing members 22 and 24 may overlap with each other, as shown in FIG. 7A. Such construction more facilitates the firm holding of the slider 28 with respect to the casing 20. However, both side walls 38 and 42 may have substantially the same thickness.

In FIGS. 3 and 4, reference numerals 58 and 60 each designate a hole for inserting a reel shaft therein 62 indicates an elastic member, and 64 is a plug for preventing false erase.

The magnetic tape cassette of the illustrated embodiment constructed as described above is assembled in such a manner that the side walls 42 of the lower casing member 24 are slidly fitted in the side walls 34 of the slider 28 to mount the slider 28 on the lower casing member 24, and then the upper casing member 22 is combined with the lower casing member 24, as shown in FIG. 3. While the cassette is not used, the slider 28 is held at a position of closing the casing and the front opening of the casing 20, is closed with the front lid 32 to sealedly house a magnetic tape in the casing 20. When the cassette is then charged in a cassette deck or a recording and/or reproducing apparatus, the slider 18 is backwardly moved, and the front lid 32 is opened for operation.

As can be seen from the foregoing, in the magnetic tape cassette of the illustrated embodiment, the slider 28 is formed at each of the side walls 34 with the lower portion 44 arranged opposite to the outer surface 46 of the side wall 42 of the lower casing member 24, the intermediate portion 48 fitted or inserted in the gap D between the side walls 38 and 42 of the upper and lower case members 22 and 24, and the upper portion 50 arranged opposite to the inner surface 52 of the side wall 38 of the upper casing number 22. Also, the inner surface 52 of the side wall 38 of the upper casing member 22 is positioned inwardly from the outer surface 46 of the side wall 42 of the lower casing member 24. Such construction of the illustrated embodiment effectively prevents the slider 28 from being separated from the casing 20 even when the cassette is dropped or any external force is applied to the cassette, because the casing 20 constantly firmly holds the upper portion 50 of the side wall 34 of the slider 28 therein, resulting in a magnetic tape being safely received in the casing 20. Also, the construction facilitates assembling of the cassette and effectively prevents any foreign matter such as dust or the like from entering the cassette.

THE SECOND EMBODIMENT

FIGS. 8 and 9 show another embodiment of a magnetic tape cassette according to the present invention. In a magnetic tape cassette shown in FIGS. 8 and 9, slider separation preventing means is provided by positioning an inner surface 52 of each of side walls 38 of an upper casing member 22 which constitutes a casing in cooperation with a lower casing member 24 outwardly from an outer surface 46 of each side wall 42 of the lower casing member 24 with a slit H being defined therebetween and forming an upper portion 50 of each side wall 34 of a slider 28 into a thickness $H_1$ larger than the slit H. The upper casing member 22 may be so formed that an outer surface 54 of each of the side walls 38 may be vertically substantially flush with an outer surface of the side wall 34 of the slider 28, as shown in FIG. 8 for the purpose of facilitating handling of the cassette. Alternatively, the outer surface 54 of the upper casing member 22 may be positioned outwardly from the outer surface of the slider 28, as shown in FIGS. 9A and 9B. Also, the embodiment may be so constructed that the upper portion 50 of the side wall 34 of the slider 28 is intermittently or continuously formed with a projection 70 to increase a thickness of the upper portion 50, as shown in FIG. 9A.

The remaining of the embodiment shown in FIGS. 8 and 9 may be constructed in substantially the same manner as that shown in FIGS. 2 to 7.

As described above, in the magnetic tape cassette shown in FIGS. 8 and 9, the inner surface 52 of the side wall 38 of the upper casing member 22 is positioned outwardly from the outer surface 46 of the side wall 42 of the lower casing member 24, and the upper portion 50 of the side wall 34 of the slider 28 has a thickness $H_1$ larger than the slit H defined between the inner surface 52 of the upper casing member 22 and the outer surface 46 of the lower casing member 24. Such construction likewise effectively prevents the slider 28 from being separated from the casing even when the cassette is dropped or any external force is applied to the cassette, because the upper and lower casing members 22 and 24 firmly hold the upper portion 50 of the side wall 34 of the slider 28 in the casing in cooperation with the thickness of the upper portion 50, resulting in a magnetic tape being safely received in the casing. Also, the construction facilitates assembling of the cassette and effectively prevents any foreign matter such as dust or the like from entering the cassette.

As can be seen from the foregoing, the magnetic tape cassette of the present invention is provided with the slider separation preventing means, resulting in exhibiting satisfactory safety and reliability.

It will thus be seen that the objects set forth above, among those made apparent from the preceding description, are efficiently attained since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A magnetic tape cassette comprising:
   (a) an upper casing member and a lower casing member which are combined together to constitute a casing adapted to receive a magnetic tape therein, said upper and lower casing members including side walls defining a gap therebetween, and
   (b) a slider slidably mounted on said lower casing member so as to cover a part of the bottom and sides of said lower casing member, said slider including:
      (i) side walls each comprising a lower portion opposite to an outer surface of each of said side walls of said lower casing member;
      (ii) an intermediate portion arranged in said gap; and
      (iii) an upper portion arranged opposite to an inner surface of each of said side walls of said upper casing member,
   wherein:
   (c) said inner surface of each of said side walls of said upper casing member is positioned outwardly from said outer surface of said side wall of said lower casing member with a slit being defined therebetween and
   (d) each of said upper portions of said side wall of said slider has a thickness larger than said slit,
   whereby said slider is prevented from being separated from said casing.

2. A magnetic tape cassette as defined in claim 1, wherein an outer surface of said side wall of said upper casing member is vertically substantially flush with an outer surface of said side wall of said slider.

3. A magnetic tape cassette as defined in claim 1, wherein said upper portion of said slider is formed at at least a part thereof with a projection to increase a thickness of said upper portion.

4. A magnetic tape cassette comprising:
(a) an upper casing member and a lower casing member which are combined together to constitute a casing adapted to receive a magnetic tape therein, said upper and lower casing members including side walls defining a gap therebetween, and
(b) a slider slidably mounted on said lower casing member so as to cover a part of the bottom and sides of said lower casing member, said slider including:
  (i) side walls each comprising a lower portion opposite to an outer surface of said side wall of said lower casing member;
  (ii) an intermediate portion arranged in said gap; and
  (iii) an upper portion arranged opposite to an inner surface of said side wall of said upper casing member,
wherein:
(c) said inner surface of each of said side walls of said upper casing member is positioned outwardly from said outer surface of said side wall of said lower casing member with a slit being defined therebetween and
(d) each of said upper portions of said side wall of said slider is formed into a thickness larger than said slit.

* * * * *